United States Patent
Takahashi et al.

(10) Patent No.: US 6,205,805 B1
(45) Date of Patent: Mar. 27, 2001

(54) MOTOR VEHICLE DEHUMIDIFIER WITH DRYING AGENT AND DRYING AGENT REGENERATIVE CONTROL

(75) Inventors: Koji Takahashi, Kariya; Yuichi Shirota, Anjo; Koichi Ban, Tokai, all of (JP)

(73) Assignee: Denso Corporation, Kariya (JP)

(*) Notice: Subject to any disclaimer, the term of this patent is extended or adjusted under 35 U.S.C. 154(b) by 0 days.

(21) Appl. No.: 09/228,440

(22) Filed: Jan. 11, 1999

(30) Foreign Application Priority Data

| Jan. 13, 1998 | (JP) | 10-004884 |
| Aug. 7, 1998 | (JP) | 10-224448 |
| Nov. 4, 1998 | (JP) | 10-313713 |

(51) Int. Cl.$^7$ .................................................. F25D 23/00
(52) U.S. Cl. .................................................. 62/271; 62/94
(58) Field of Search .................................. 62/271, 94, 93

(56) References Cited

U.S. PATENT DOCUMENTS

| 4,180,985 | * | 1/1980 | Northup, Jr. ................ 62/271 X |
| 4,719,761 | * | 1/1988 | Cromer ........................ 62/271 X |
| 5,423,187 | * | 6/1995 | Fournier ........................... 62/94 |
| 5,471,852 | * | 12/1995 | Meckler ........................... 62/271 |
| 5,509,275 | * | 4/1996 | Bhatti et al. ...................... 62/271 |
| 5,732,562 | * | 3/1998 | Moratalla ........................... 62/93 |
| 5,937,667 | * | 8/1999 | Yoho ................................ 62/271 |
| 5,950,447 | * | 9/1999 | Maeda et al. ...................... 62/271 |

FOREIGN PATENT DOCUMENTS 9-156349   6/1997   (JP).

* cited by examiner

Primary Examiner—Corrine McDermott
Assistant Examiner—Chen-Wen Jiang
(74) Attorney, Agent, or Firm—Harness, Dickey & Pierce, PLC

(57) ABSTRACT

A motor vehicle dehumidifier, including a dehumidifying drying agent, that can provide a required dehumidifying capacity with a reduced overall quantity of drying agent compared to conventional drying agent-based dehumidifiers. In the present invention, a heat exchanger is disposed on an upstream side of a drying agent unit, and heat is exchanged in the heat exchanger between inside air to be dehumidified and low-temperature outside air used to cool the inside air. The air cooled by the heat exchanger flows into the drying agent unit and is dehumidified. Because the air has an increased relative humidity as a result of being cooled, the amount of water adsorbed from it per unit of drying agent is increased, as the water adsorption characteristic of the drying agent is greatly influenced by the relative humidity of the air passing over it, and is markedly improved by an increase in the relative humidity of that air.

10 Claims, 7 Drawing Sheets

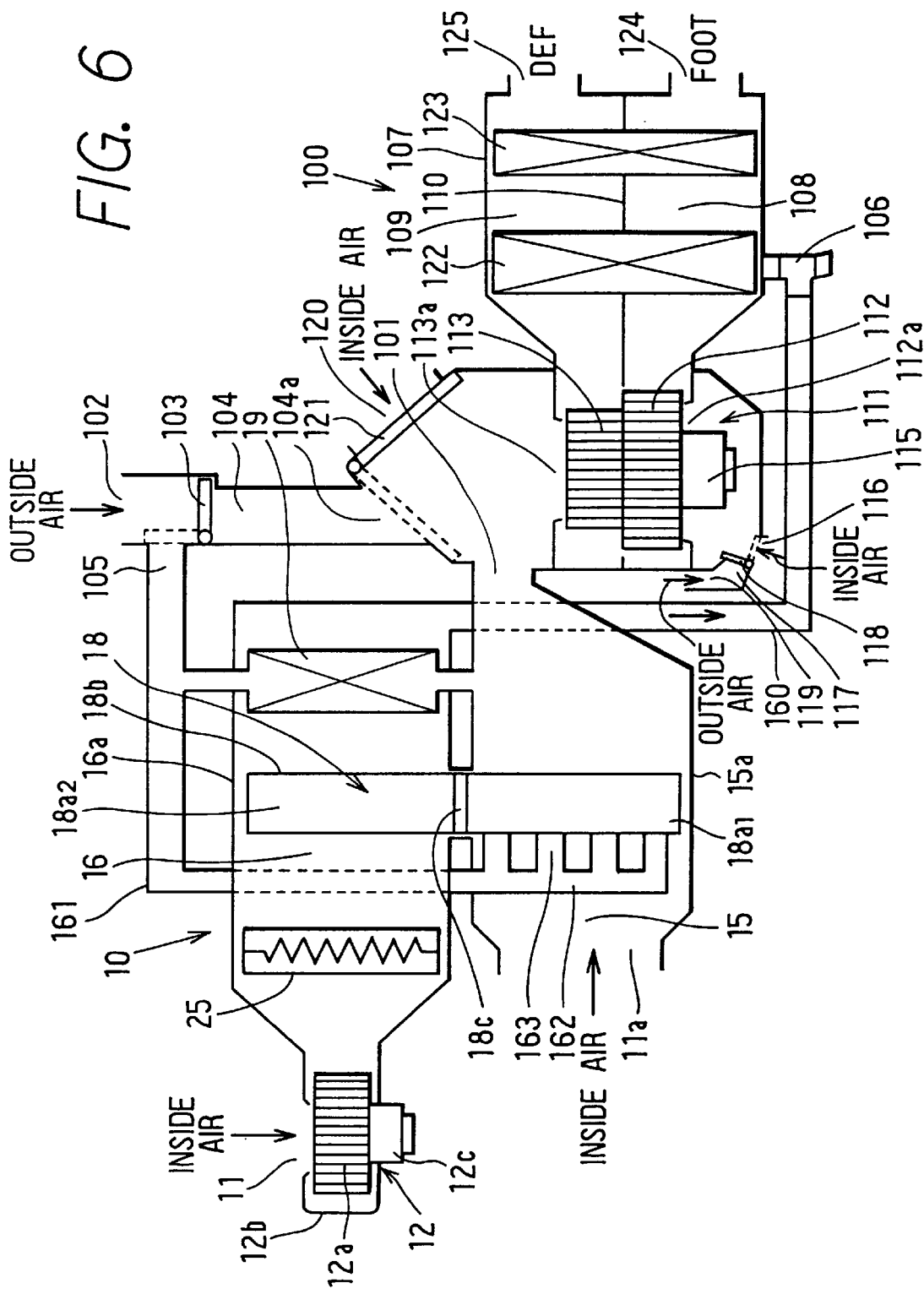

MOTOR VEHICLE DEHUMIDIFIER WITH DRYING AGENT AND DRYING AGENT REGENERATIVE CONTROL

CROSS REFERENCE TO RELATED APPLICATIONS

This application is related to, and claims priority in, Japanese patent application Nos. Hei. 10-4884, 10-224448, and 10-313713, each being incorporated herein by reference.

BACKGROUND OF THE INVENTION

1. Field of the Invention

This invention relates generally to vehicle air conditioning systems, and more particularly to a vehicle air conditioning system dehumidifier for dehumidifying ventilation air via a drying agent.

2. Description of the Related Art

In automotive vehicle air-conditioning systems, a passenger compartment is typically heated by utilizing warm water from an engine as a heat source. However, in recent years, as vehicle engines have become more efficient, the resulting temperature of the engine water has decreased, causing the heating capacity of the systems to often become insufficient.

To eliminate the above heating capacity deficiency, many conventional systems increase the percentage of inside air taken in to reduce the heating load. Specifically, an auxiliary door for mixing inside air with outside air has been added to a system inside/outside air switching box, or an inside/outside air 2-layer mode wherein only outside air is delivered to a defroster outlet side, and only inside air is delivered to a foot outlet side.

However, even in this inside/outside air 2-layer mode, when the percentage of inside air exceeds 50%, window fogging caused by increased humidity inside the passenger compartment occurs. Therefore, to reduce the heat load by increasing the percentage of re-circulated inside air and to simultaneously prevent window fogging, the atmosphere inside the passenger compartment must be dehumidified.

In Japanese Patent Application Laid-open No. H.9-156349, the present inventors have proposed dehumidifying the interior of the passenger compartment by means of a dehumidifier which utilizes a drying agent. However, because the amount of water adsorbed per unit of drying agent is small, a large overall amount of drying agent is necessary to obtain a required dehumidifying capacity. As a result, various problems arise, such as increased installation space required by the system as a whole due to the volume of the drying agent, increased airflow resistance presented by the drying agent, and increased energy required to regenerate the drying agent.

Also, a granular drying agent such as silica gel or zeolite is generally used as the drying agent. Thus, as water from passenger compartment air is adsorbed onto the drying agent, condensation of water vapor occurs and heat of condensation is produced. As a result, the temperature of the drying agent is raised by this heat of condensation, and the dehumidifying capacity of the drying agent consequently decreases.

SUMMARY OF THE INVENTION

It is therefore an object of the present invention to improve the dehumidifying capacity of a drying agent-based dehumidifier.

The present invention achieves the above object based on the fact that a water adsorption characteristic of the drying agent is greatly influenced by the relative humidity of the air passing over it, and is markedly improved by an increase in the relative humidity of that air. In the present invention, an air cooling unit, such as a heat exchanger, is disposed upstream of a drying unit housing the drying agent to cool air supplied from the inside of a compartment such as a motor vehicle passenger compartment. The air, having a high relative humidity after being cooled by the air cooling unit, is then dehumidified by the drying agent unit.

Consequently, the amount of water adsorbed per unit of drying agent can be greatly increased. As a result, the overall amount of drying agent required to obtain a dehumidifying capacity can be greatly reduced. Therefore, overall system size can be reduced due to the smaller amount of drying agent required, airflow resistance caused by the drying agent is reduced, and energy required for regenerating the drying agent is reduced.

According to another aspect of the present invention, a drying agent cooler for cooling the drying agent is provided to suppress a rise in temperature of the drying agent caused by heat of condensation of water vapor produced as the drying agent adsorbs water from the air. As a result, the water adsorbing capacity, that is, the dehumidifying capacity, of the drying agent can be increased.

According to another aspect of the invention, the drying agent cooler cools the drying agent unit with outside air. Because the outside air temperature is often around 0° C. during the winter, the low-temperature outside air can be utilized to effectively cool the drying agent, and thereby the construction of the dehumidifier can be simplified.

With this construction, in an air-conditioning system for a vehicle having an inside/outside air 2-layer flow mode, it is possible to reduce the heat load by increasing the proportion of re-circulated inside air and to prevent fogging of the windshield glass by dehumidified inside air and outside air being mixed together and blown out through the defroster outlet.

BRIEF DESCRIPTION OF THE DRAWINGS

FIG. 6 is a schematic sectional view of a fourth preferred embodiment of the present invention;

DETAILED DESCRIPTION OF THE PREFERRED EMBODIMENTS

Preferred embodiments of the invention will now be described with reference to the accompanying drawings.

(First Preferred Embodiment)

Figure 1:
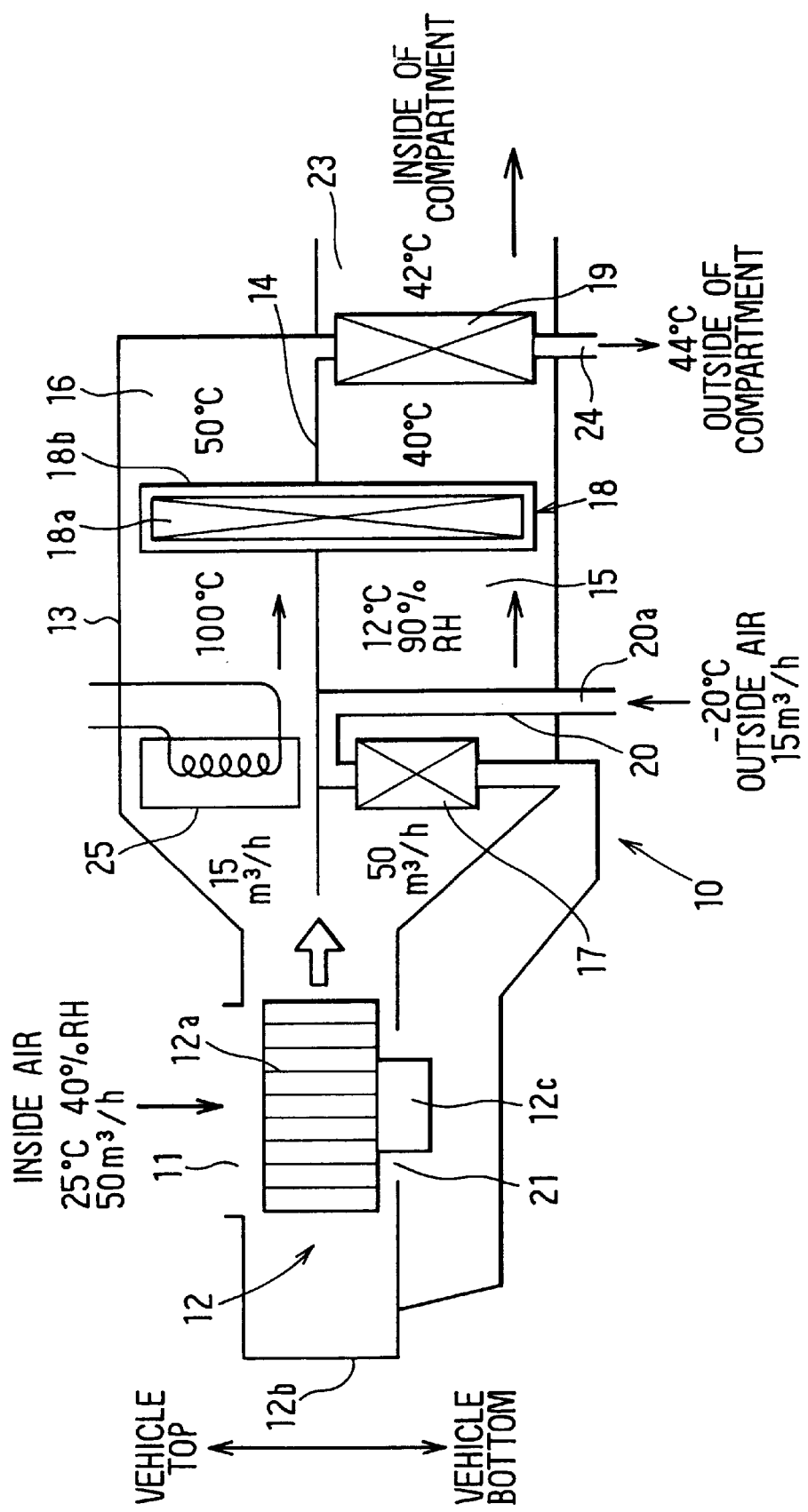
FIG. 1 is a schematic sectional view of a first preferred embodiment of the present invention.

FIG. 1 shows a first preferred embodiment of a dehumidifier constructed as a dehumidifier for use in an automotive vehicle. This dehumidifier 10 is installed in a trunk compartment at the rear of a vehicle, independently from ducting of a vehicle air-conditioning system. An inside air inlet 11 of the dehumidifier 10 connects with a rear part of the passenger compartment of the vehicle through an opening in a rear passage tray (not shown) at the rear of the passenger compartment.

A blower 12 is disposed below this inlet 11. This blower 12 has an ordinary centrifugal multi-vane fan 12a and a scroll case 12b inside which the fan 12a is rotatably mounted; the fan 12a is driven by a motor 12c whereby the blower 12 blows air outward in the radial direction of the fan 12a.

A case 13 is connected to an air delivery opening of the scroll case 12b. A duct inside the case 13 is partitioned by a partitioning wall 14 into a first duct 15 for dehumidification and a second duct 16 for regeneration. That is, a first duct 15 for dehumidification is formed in a lower side in the vertical direction of the vehicle and a second duct 16 for regeneration is formed in an upper side.

A first heat exchanger 17 is disposed at the inlet of the first duct 15 for dehumidification. A drying agent unit 18 containing a drying agent is disposed on the downstream side of this first heat exchanger 17, and a second heat exchanger 19 is disposed on the downstream side of the drying agent unit 18. Here, the first heat exchanger 17 is for exchanging heat between inside air in the duct 15 and low-temperature outside air.

The first heat exchanger 17 is connected to an outside air passage 20 and one end 20a of the outside air passage 20 opens outside the passenger compartment and takes in low-temperature outside air during winter heating. The other end of the outside air passage 20 connects with the negative pressure part of the fan 12a by way of an auxiliary inlet 21 formed around the outside of the motor 12c of the blower 12. As a result, when the fan 12a is driven, low-temperature outside air flows through the outside air passage 20 and the first heat exchanger 17 to the negative pressure part of the fan 12a.

Because the first heat exchanger 17 exchanges heat between an outside air passage through which outside air flows and an inside air passage through which inside air delivered by the fan 12a flows, it can cool inside air with low-temperature outside air. A plurality of mounting stays (not shown) extend radially from the motor 12c of the blower 12, and the motor 12c is mounted to the bottom of the scroll case 12b by these mounting stays.

The drying agent unit 18 may be one of the agents described in Japanese Patent Application Laid-open No. H.9-156349. In other words, the drying agent preferably has a granular drying agent 18a such as silica gel or zeolite contained in a porous bag, and the porous bag is held inside a disc-shaped case body 18b. Both of the axial direction end faces of the case body 18b are open except for dividing parts for holding the bag, whereby the airflow resistance of the drying agent unit 18 is made as small as possible.

Figure 2:
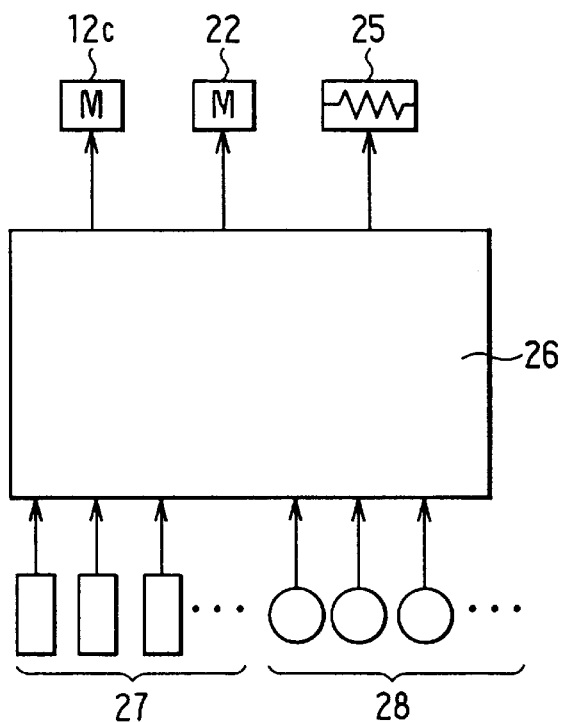
FIG. 2 is a block diagram illustrating electronic control in the first preferred embodiment.

The drying agent unit 18 is disposed extending not only into the first duct 15 for dehumidification in the lower side of the dehumidifier 10 but also into the second duct 16 for regeneration in the upper side, and the case body 18b is rotatably mounted inside the case 13 and rotationally driven by driving means such as a motor 22 (FIG. 2).

The second heat exchanger 19 utilizes heat used to regenerate the drying agent unit 18 to increase the temperature inside the passenger compartment, and heats air in the first duct 15 for dehumidification in the lower side of the dehumidifier 10 with high-temperature air from the second duct 16 for regeneration in the upper side. This second heat exchanger 19 may be of the same construction as the first heat exchanger 17. A delivery opening 23 for delivering air into the passenger compartment is provided in the first duct 15 for dehumidification, downstream of the second heat exchanger 19. Also, an outlet 24 for exhausting regenerating air from the second heat exchanger 19 opens outside the passenger compartment.

In the second duct 16, an electric heating element 25 is disposed on the upstream side of the drying unit 18. This electric heating element 25 heats the air in the second duct 16 and consists of a resistor (a PTC heater) having a positive resistance-temperature coefficient such that its electrical resistance sharply increases at a predetermined Curie point.

FIG. 2 is a control block diagram. A vehicle air-conditioning system control unit 26 consists of a microcomputer or the like and controls the electrical devices mentioned above (12c, 22 and 25) according to a preset program. Signals from switches 27 on an operating panel of the vehicle air-conditioning system and sensors 28 for air-conditioning control are input into the control unit 26.

Operation of the first preferred embodiment will now be described. During winter heating, when the control unit 26 determines that the air-conditioning system is in a maximum heating state and that the air-conditioning system is in an inside air re-circulation mode, or that an inside air intake rate is greater than a predetermined proportion (for example greater than 80%), the control unit 26 initiates operation of the dehumidifier 10. That is, a current is passed through the motor 12c of the blower 12 and the blower fan 12a operates, while a current is simultaneously passed through the electric heating element 25 and the electric heating element 25 starts to generate heat.

Also, the motor 22 is intermittently driven and rotates the drying agent unit 18 through a predetermined angle (for example 180°), thereby reversing the position of the drying agent unit 18 with respect to the two ducts 15 and 16 at predetermined time intervals. Here, alternatively, the motor 22 may be driven continuously, the rotational speed of the motor 22 can be made extremely low, and the drying agent unit 18 thereby rotated continuously.

As a result of the operation of the blower fan 12a, air from inside the passenger compartment is taken in by the fan 12a through the inlet 11. Also, a small flow of outside air is taken in by the fan 12a through the outside air passage 20, the first heat exchanger 17 and the auxiliary inlet 21. This small flow of outside air is then mixed with the inside air, and the resulting air is blown in parallel down the first duct 15 for dehumidification and the second duct 16 for regeneration.

Operation of the above embodiment will now be explained given the following example. It will now be supposed that the overall airflow of the fan 12a is 65 m$^3$/h; outside air at −20° C. is taken in to the outside air passage 20 at an airflow of 15 m$^3$/h; inside air at temperature 25° C. and relative humidity RH 40% is taken in through the inlet 11 at an airflow of 50 m$^3$/h; air is blown through the first duct side at an airflow of 50 m$^3$/h; and air is blown through the second duct side at an airflow of 15 m$^3$/h.

In the above case, the inside air is cooled in the first heat exchanger 17 by outside air at −20° C. and its relative humidity RH increases to 90%. Because the relative humidity RH of the air is increased to 90% prior to the air flowing into the drying agent unit 18, the dehumidifying capacity of the drying agent 18a is effectively increased.

Figure 3:
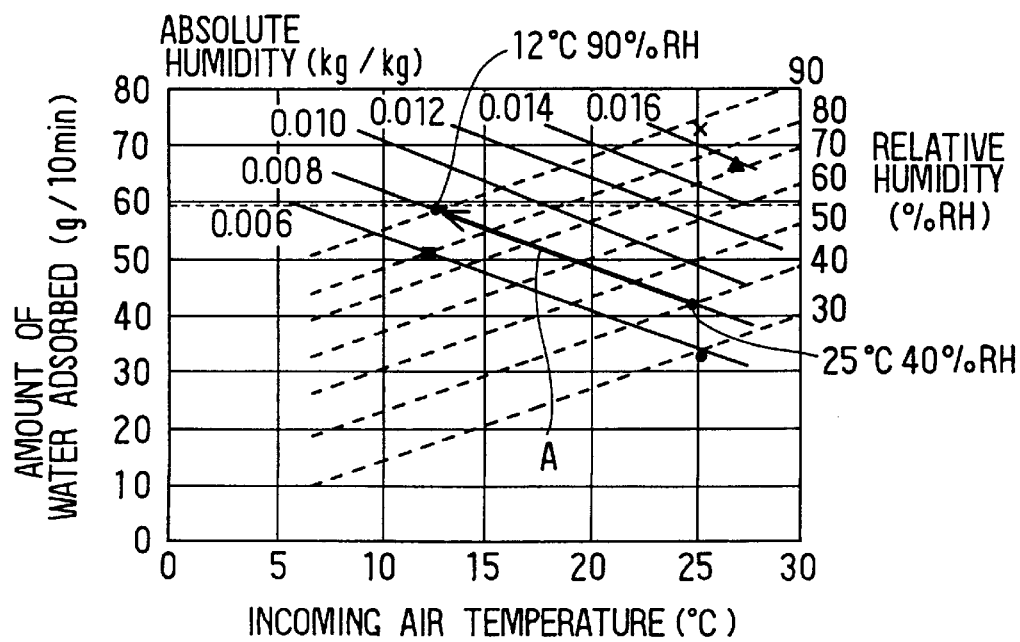
FIG. 3 is a water adsorption characteristic diagram of a drying agent utilized in the present invention.

Referring to FIG. 3, intake air temperature of the drying unit 18 is taken on the horizontal axis, the rate of adsorption of water by the drying agent 18a (g/10 min) is taken on the left side vertical axis, and the relative humidity RH (%) of the intake air of the drying agent unit 18 is taken on the right side vertical axis. In the figure, the dashed lines show the relative humidity RH of the intake air and the solid lines show the absolute humidity (kg/kg) of the intake air.

As can be understood from FIG. 3, when inside air at temperature 25° C., relative humidity RH 40% is taken in to the drying unit 18, the rate of adsorption of water by the drying agent 18a is about 40 g/10 min. In the preferred embodiment described above, when air at temperature 12° C., relative humidity RH 90% is taken in to the drying agent unit 18, the rate of adsorption of water by the drying agent 18a increases to about 60 g/10 mins, and thus the water adsorption capacity, i.e. the dehumidifying capacity, can be increased by a factor of about 1.5. The arrow A in FIG. 3 shows the dehumidifying capacity increasing effect of the cooling action of the first heat exchanger 17.

The air flowing through the regenerating second duct 16 side at 15 m³/h, on the other hand, is heated by the electric heating element 25 and rises in temperature to around 100° C. As a result of this temperature rise, the relative humidity RH of the air on the second duct 16 side decreases. This heated air flows into the part of the drying agent unit 18 positioned in the second duct 16.

When the drying agent 18a is regenerated, the state of water adsorption is released in the drying agent 18a, and water is discharged from the drying agent 18a in a vapor state. The higher the temperature of the heated air flowing into the drying agent 18a is, and the lower the relative humidity RH of the heated air is, the greater its capacity becomes to regenerate the drying agent 18a. Therefore, due to the heat generated by the electric heating element 25, it is preferable to keep the airflow at a low level and increase the temperature to which the air is heated, rather than increase the airflow, to increase the regenerating capacity of the heated air.

Because the air on the second duct side has heat absorbed from it by the drying agent unit 18 as it passes through the drying agent unit 18, its temperature falls from around 100° C. to around 50° C., and due to the discharge of water vapor from the drying agent 18a its relative humidity RH rises to about 40%.

The air on the first duct side, on the other hand, absorbs heat from the drying agent unit 18 and rises in temperature to about 40° C., thereby becoming low-humidity warm air as it passes through the drying agent unit 18. Thereafter, in the second heat exchanger 19, heat exchange is carried out between the low-humidity air on the first duct side and the high-temperature regenerating air on the second duct side, and the air on the first duct side increases in temperature to 42° C. (for example, 40° C.→42° C.) before being blown out through the delivery opening 23 into the passenger compartment. Thus, because low-humidity warm air is blown into the passenger compartment, it is possible to both prevent fogging of the windshield glass and increase the temperature inside the passenger compartment.

Also, due to the heat-recovering action of the second heat exchanger 19, it is possible to effectively utilize heat for regenerating the drying agent 18a to contribute the temperature increase inside the passenger compartment. After passing through the second heat exchanger 19, the air in the second duct 16 falls in temperature to 44° C. before being exhausted outside the vehicle.

(Second Preferred Embodiment)

Figure 4:
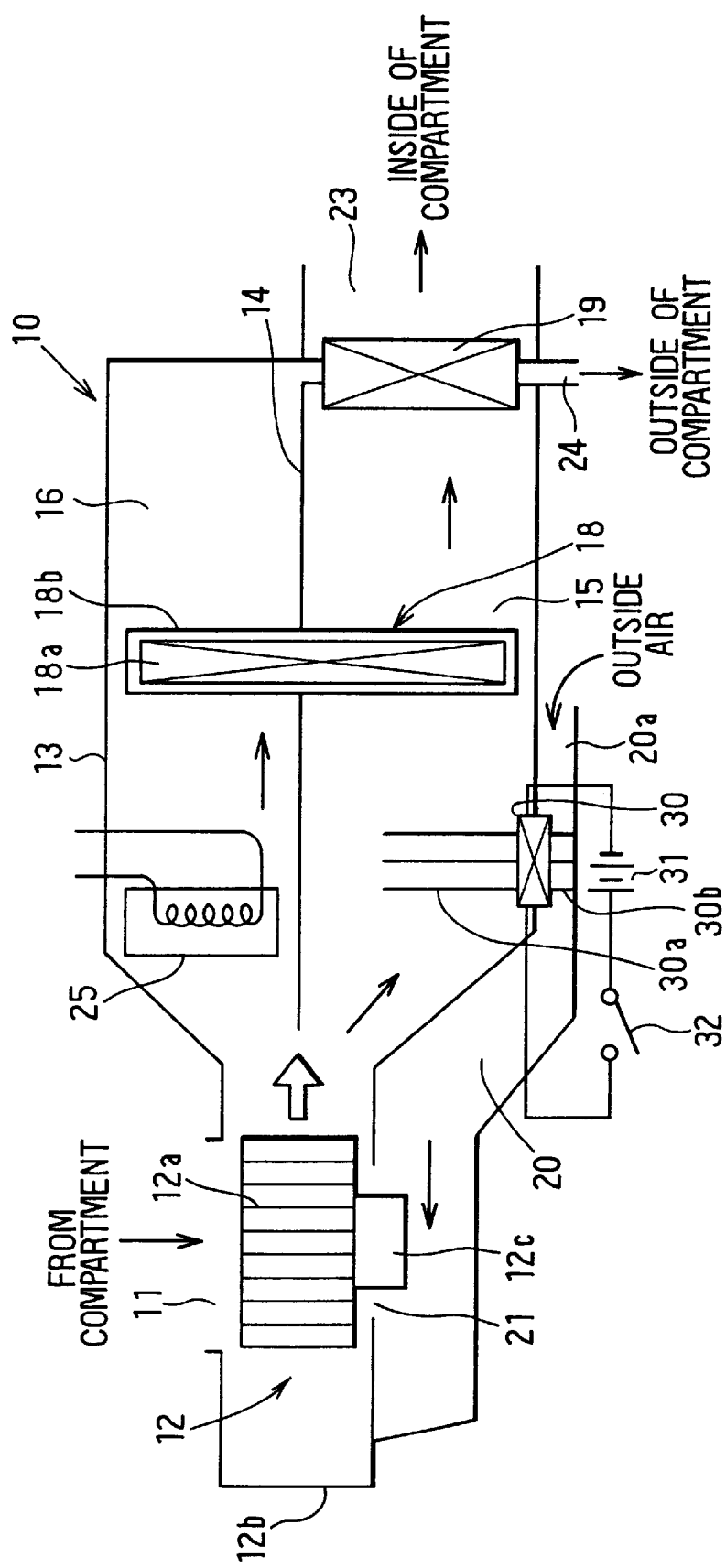
FIG. 4 is a schematic sectional view of a second preferred embodiment of the present invention.

A second preferred embodiment shown in FIG. 4 differs from the first preferred embodiment in that a Peltier device 30 is used instead of the first heat exchanger 17 on the first duct side as the cooling unit disposed upstream of the drying agent unit 18. The Peltier device 30 is a thermoelement having the known characteristic that when a current is passed through it one side of it absorbs heat and the other side radiates heat. Accordingly, in the second preferred embodiment, heat-absorbing fins 30a on one side of the Peltier device 30 are disposed in the first duct 15 upstream of the drying agent unit 18, and heat-radiating fins 30b on the other side of the Peltier device 30 are disposed in the outside air passage 20.

If a current is passed through the Peltier device 30 from a vehicle battery 31 by way of a switch 32, the heat-absorbing fins 30a on one side of the Peltier device 30 absorb heat. Consequently, the air in the first duct 15 is cooled. The absorbed heat is then radiated from the heat-radiating fins 30b into low-temperature outside air. Switching of the switch 32 is controlled by the control unit 26, as in the first preferred embodiment. In all other aspects the second preferred embodiment is the same as the first preferred embodiment.

(Third Preferred Embodiment)

Figure 5:
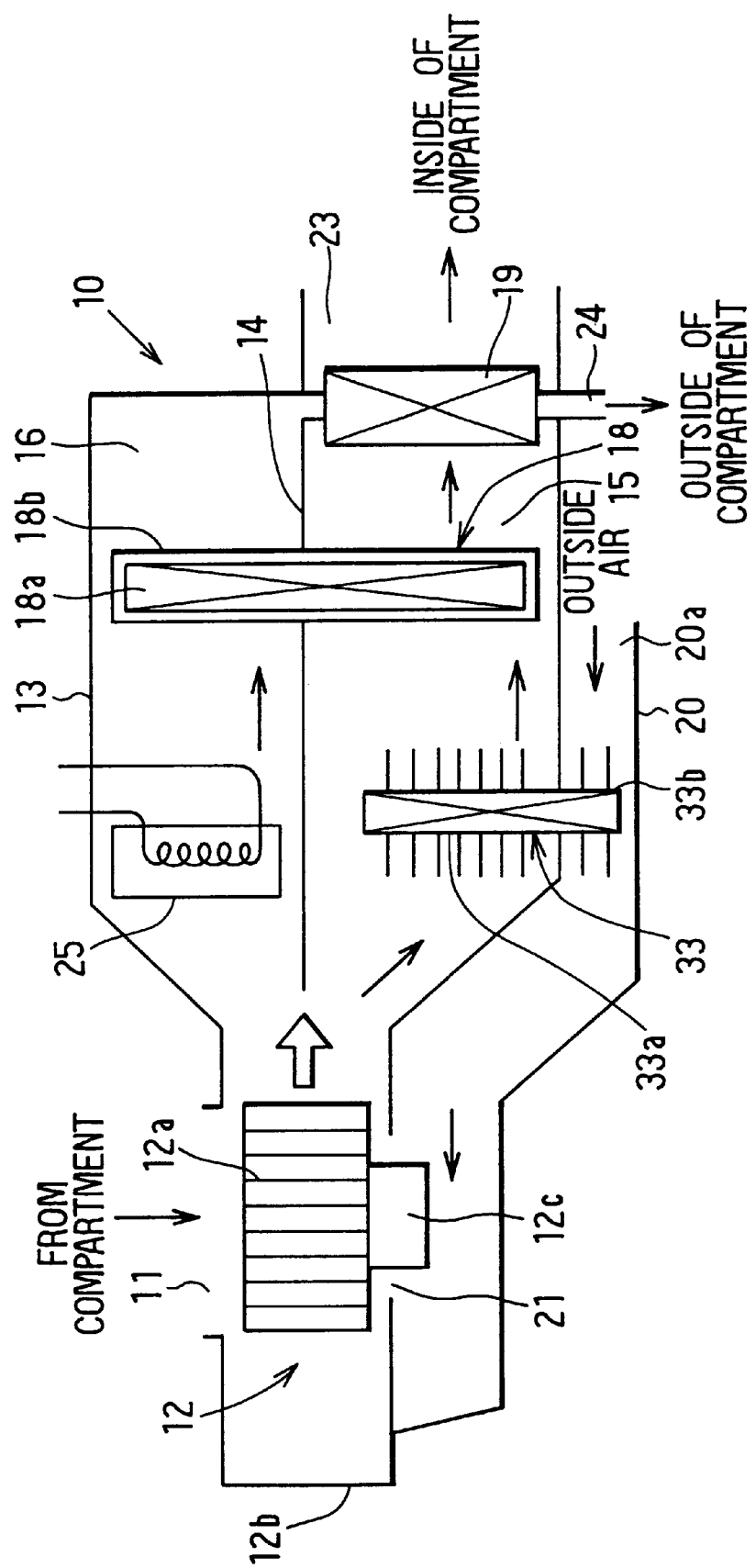
FIG. 5 is a schematic sectional view of a third preferred embodiment of the present invention.

A third preferred embodiment shown in FIG. 5 includes a heat pipe 33 as the cooling unit on the first duct side. The heat pipe 33 is a known heat siphon type heat transport device wherein a working fluid (refrigerant) sealed inside the pipe absorbs heat and evaporates in an evaporating part 33a at one end of the pipe, and releases heat and condenses in a condensing part 33b at the other end of the pipe. Through repetition of this evaporating and condensing, heat is moved from the evaporating part 33a to the condensing part 33b.

Accordingly, the evaporating part 33a is disposed upstream of the drying agent unit 18 in the first duct 15 and the condensing part 33b is disposed in the outside air passage 20. The evaporating part 33a and the condensing part 33b are provided with fins to enlarge the respective heat transfer areas of each part.

When the heat pipe 33 is mounted in the vehicle, it is necessary for the condensing part 33b to be disposed above the evaporating part 33a so that in the heat pipe 33 the condensed liquid refrigerant in the condensing part 33b is returned to the evaporating part 33a by the difference in specific gravity between liquid refrigerant and evaporated refrigerant. In other respects the third preferred embodiment is the same as the first and second preferred embodiments.

(Fourth Preferred Embodiment)

FIG. 6 shows a fourth preferred embodiment, in which the invention is applied to a vehicle air-conditioning system dehumidifier. The dehumidifier 10 is integrally connected to the intake side of a ducting system of a front air-conditioning unit 100 installed behind a dash board at the front of the passenger compartment of a vehicle.

In the dehumidifier 10, a first duct 15 for dehumidification is formed by a case 15a, and a second duct 16 for regeneration is formed by a case 16a, the two ducts 15, 16 being formed in parallel. The upstream end of the first duct 15 has an inlet 11a for taking in air from the passenger compartment (inside air) for re-circulation at the dash board in the passenger compartment. The downstream end of the first duct 15 connects with a dehumidified inside air inlet 101 of the front air-conditioning unit 100.

The upstream end of the second duct 16 also has an inside air inlet 11 at the dash board in the passenger compartment.

A regeneration blower 12 is disposed immediately behind the inlet 11. The blower 12 has an ordinary centrifugal multi-vane fan (sirocco fan) 12a and a scroll case 12b inside which the fan 12a is rotatably mounted. The fan 12a is driven by a motor 12c, whereby the blower 12 blows inside air outwardly in the radial direction of the fan 12a.

In the second duct 16 for regeneration, an electric heating element 25 is disposed in a position immediately behind, or downstream from, the air outlet of the scroll case 12b, and in front, or upstream, of a drying agent unit 18. The electric heating element 25 heats the air in the second duct 16 and includes a resistor (a PTC heater) having a positive resistance-temperature coefficient such that its electrical resistance sharply increases at a predetermined Curie point.

The drying agent unit 18, as in the first through third preferred embodiments described above, has a porous bag containing a granular drying agent $18a_1$, $18a_2$ such as silica gel or zeolite. The bag is held inside a disc-shaped case body 18b. Both of the axial direction end faces of the case body 18b are entirely open except for dividing parts for holding the bag, whereby the airflow resistance of the drying agent unit 18 is made as small as possible.

The drying agent unit 18 extends from the first duct 15 for dehumidification, which is in the lower side of the dehumidifier 10, into the second duct 16 for regeneration, which is in the upper side of the dehumidifier 10. Its case body 18b is rotatably mounted inside the two cases 15a, 16a about a center part 18c and rotationally driven by a motor 22 shown in FIG. 2. In the figure, $18a_1$ denotes drying agent on the dehumidification side positioned in the first duct 15 for dehumidification, and $18_{a2}$ denotes a drying agent on the regeneration side positioned in the second duct 16 for regeneration.

The drying agent unit 18 is rotated by the motor 22 at predetermined time intervals 180° at a time, whereby the drying agent $18a_1$ on the dehumidification side and the drying agent $18a_2$ on the regeneration side are alternately reversed.

An outside air inlet 102 of the air-conditioning unit 100 is for introducing air from outside the passenger compartment. The outside air inlet 102 connects with two outside air passages 104, 105 oppositely opened and closed by an outside air changeover door 103. Outside air guided into the outside air passage 105 is heated by a heat exchanger 19 for recovering regeneration heat before being supplied to the downstream side of the drying agent unit 18 in the duct 15.

That is, the heat exchanger 19 corresponds to the second heat exchanger 19 of FIGS. 1, 4 and 5, and in this preferred embodiment is disposed on the downstream side of the drying agent unit 18 in the second duct 16 to perform heat exchange between high-temperature air heated by the electric heating element 25 and low-temperature outside air to recover heat from the regeneration side and thereby increase the temperature in the passenger compartment.

The downstream side of the heat exchanger 19 in the second duct 16 is connected by a connecting duct 160 to a condensed water discharge pipe 106 of the air-conditioning unit 100. Air that has exchanged heat with the heat exchanger 19 and consequently fallen in temperature is discharged outside the vehicle through the connecting duct 160 and the condensed water discharge pipe 106.

Also, some of the outside air entering the outside air passage 105 is supplied by a connecting duct 161 to a distributing duct 162. The distributing duct 162 has a plurality of outside air blowout openings 163 disposed facing the upstream side of the dehumidification side drying agent $18a_1$ positioned in the first duct 15. The distributing duct 162 and the outside air blowout openings 163 blow outside air onto the dehumidification side drying agent $18a_1$.

Due to the winter low-temperature outside air being blown onto the dehumidification side drying agent $18a_1$ in the first duct 15 from the outside air blowout openings 163 to cool the dehumidification side drying agent $18a_1$, the temperature rise of the dehumidification side drying agent $18a_1$ caused by heat of condensation during water adsorption is minimized, and loss of water adsorbing capacity caused by such temperature rise is suppressed.

The front air-conditioning unit 100 will now be briefly described. In this preferred embodiment the air-conditioning unit 100 includes an inside/outside air 2-layer flow mode. The inside of a case 107 of the air-conditioning unit 100 forms a first air duct 108 for inside air in its lower side and a second air duct 109 for outside air on its upper side. These two air ducts 108, 109 are separated by a partition member 110.

An air-conditioning blower 111 mounted in the upstream end of the case 107 has a first fan 11 for blowing air into the first air duct 108 and a second fan 113 for blowing air into the second air duct 109. The two fans 112, 113 are independent of each other but are both driven by a common motor 115. The two fans 112, 113, like the fan 12a of the blower 12, consist of ordinary centrifugal multi-vane fans, such as sirocco fans.

Inside air from an inside air inlet 116 or outside air from an outside air inlet 117 is taken in to the intake opening 112a of the first fan 112 on the lower side. The inside air inlet 116 and the outside air inlet 117 are switched between by a first inside-outside air switching door 118. Outside air flows to the outside air inlet 117 from the above-mentioned outside air passage 104 through a connecting passage 119.

Inside air from an inside air inlet 120, outside air from an outside air inlet 104a provided in the outside air passage 104, or dehumidified inside air from the dehumidified inside air inlet 101 passes through the intake opening 113a of the second fan 113. The inside air inlet 120 and the outside air inlet 104a are switched by a second inside-outside air switching door 121. The positions of the doors 103, 118 and 121 in FIG. 6 show the inside/outside air 2-layer flow mode state.

Inside the case 107, a heat exchanger for cooling 122 is disposed on the upstream side, and a heat exchanger for heating 123 is disposed on the downstream side. These two heat exchangers 122, 123 extend across both the first air duct 108 for inside air and the second air duct 109 for outside air. The heat exchanger 122 is a refrigerating cycle evaporator, and the heat exchanger 123 is a warm water type heater core that utilizes hot water from a water-cooled vehicle engine as its heat source.

A foot outlet 124 is disposed at the downstream end of the first air duct 108 for inside air, and air can blow out onto the feet of a passenger in the passenger compartment through this foot outlet 124. A defroster outlet 125 is disposed at the downstream end of the second air duct 109 for outside air, and air can blow out onto the inside of a vehicle windshield through this defroster outlet 125.

In practice, a connector (not shown) for connecting the two air ducts 108, 109 is provided to enable air from the first and second air ducts 108, 109 to be blown out through the foot outlet 124 or the defroster outlet 125 in an all-outside air mode, or an all-inside air mode, both of which may be available in addition to the inside/outside air 2-layer flow mode. Similarly, in practice, a face outlet (not shown) for blowing air from the two air ducts 108, 109 toward the head of a passenger in the passenger compartment is also provided.

The operation of the fourth preferred embodiment will now be described. During heating in winter, when the air-conditioning unit 100 is operating in a maximum heating state, the doors 103, 118 and 121 for introducing inside and outside air are operated to the positions shown by solid lines in FIG. 6, and the inside/outside air 2-layer flow mode is thereby set. That is, the first fan 112 of the air-conditioning blower 111 takes in inside air from the inside air inlet 116 and blows it into the first air duct 108. The inside air is then heated by the heat exchanger for heating 123 and blown out through the foot outlet 124 toward a passenger foot area.

The second fan 113 of the air-conditioning blower 111 takes in a mixture of inside air dehumidified by the drying agent unit 18 from the dehumidified inside air inlet 101, outside air introduced into the first duct 15 through the outside air inlet 102, the outside air passage 105, the connecting duct 161, the distributing duct 162 and the outside air blowout openings 163, and outside air introduced into the first duct 15 through the heat exchanger 19.

This mixture of inside and outside air delivered by the second fan 113 is heated by the heat exchanger 123 in the second air duct 109 and becomes low-humidity warm air. This low-humidity warm air is then blown through the defroster outlet 125 toward the vehicle windshield and prevents fogging of the windshield.

The operation of the dehumidifier 10 will now be described in detail. When the air-conditioning unit 100 is in its maximum heating state, an air-conditioning control unit (not shown) supplies power to the blower for regeneration 12 and the electric heating element 25, and the blower for regeneration 12 and the electric heating element 25 start to operate.

Also, an output signal of a timer inside the air-conditioning control unit controls operation of the drying agent unit driving means (the motor 22 of FIG. 2). Specifically, the driving means is powered at predetermined time intervals and rotates the drying agent unit 18 through a fixed angle (for example 180°) each time, thereby reversing the angular position of the drying agent unit 18 with respect to the ducts 15, 16. Alternatively, the motor 22 may be operated continuously and the speed of rotation of the motor 22 retarded to an extremely low speed to rotate the drying agent unit 18 continuously.

As a result of the operation of the second fan 113 of the air-conditioning blower 111, air inside the passenger compartment is taken in to the first duct 15 through the intake opening 11a of the dehumidifier 10 and passes through the dehumidification side drying agent $18a_1$ of the drying agent unit 18. Consequently, water vapor from the inside air condenses and is adsorbed in the liquid phase onto the dehumidification side drying agent $18a_1$, and the inside air is thus dehumidified. This dehumidified inside air is then taken in by the second fan 113 through the dehumidified inside air inlet 101.

Here, under the suction force of the second fan 113, outside air from the outside air inlet 102 enters the outside air passage 105. Some of that outside air passes through the connecting duct 161, the distributing duct 162 and the outside air blowout openings 163, and is blown onto the dehumidification side drying agent $18a_1$ in the first duct 15. Due to winter heating, the air temperature is typically around 0° C. Therefore the dehumidification side drying agent $18a_1$ can be well cooled by this low-temperature outside air.

Resulting heat of condensation arising during the adsorption of water onto the dehumidification side drying agent $18a_1$ can be absorbed by the low-temperature outside air being blown onto the drying agent, and a temperature rise of the dehumidification side drying agent $18a_1$ caused by heat of condensation can thus be suppressed. As a result, loss of water adsorption capacity caused by rising in temperature of the dehumidification side drying agent $18a_1$ can be minimized, and water adsorption capacity of the dehumidification side drying agent $18a_1$ can be maintained at a desirable level.

Also, the outside air blown out of the outside air blowout openings 163 absorbs heat from the dehumidification side drying agent $18a_1$ and consequently rises in temperature before mixing with the dehumidified inside air in the first duct 15 for dehumidification and before being blown out into the passenger compartment. Compared to a case in which low-temperature outside air is blown into the passenger compartment in an as-is condition, the temperature of the air draft can be increased to increase the temperature inside the passenger compartment.

In particular, when as in this embodiment an inside/outside air 2-layer flow mode is utilized, and dehumidified inside air in the first duct 15 on the dehumidification side and outside air are mixed and blown through the defroster outlet 125 onto the inside of the windshield glass, the defroster draft temperature can be increased and the glass temperature thereby raised. Thus, it is possible to increase the fogging resistance of the windshield.

On the other hand, due to the operation of the regeneration blower 12, inside air from the passenger compartment is taken in to the second duct 16 for regeneration and heated by the electric heating element 25. This heated air is blown against the regeneration side drying agent $18a_2$ of the drying agent unit 18 to regenerate the regeneration side drying agent $18a_2$. Here, regeneration of the drying agent $18a_2$ means that water is discharged from the drying agent $18a_2$ in a vapor state when the agent is heated.

Figure 7A:
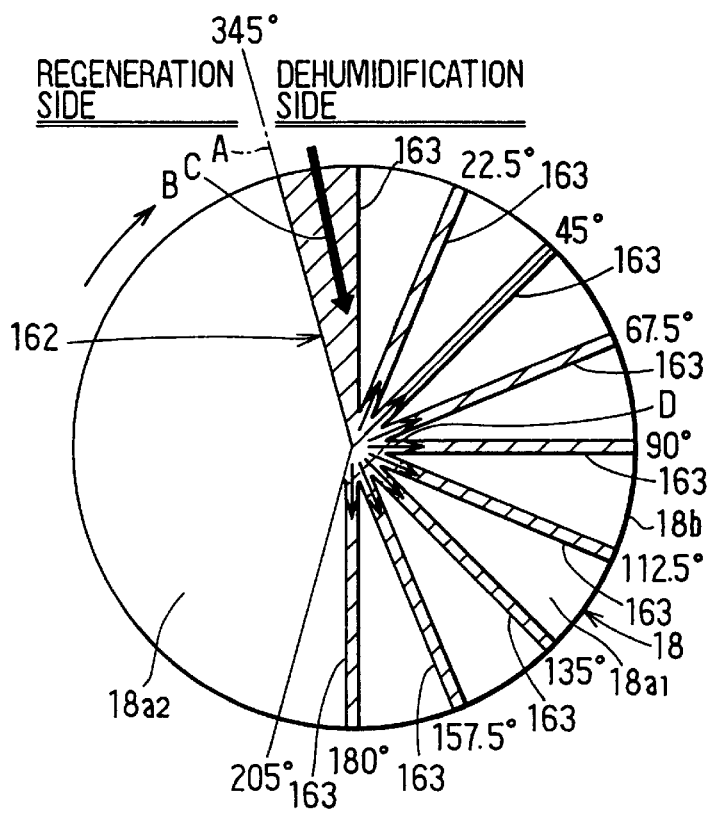
FIG. 7A is a front view and FIG. 7B a sectional side view of a specific example of blowout openings of a distributing duct in the fourth preferred embodiment.
Figure 7B:
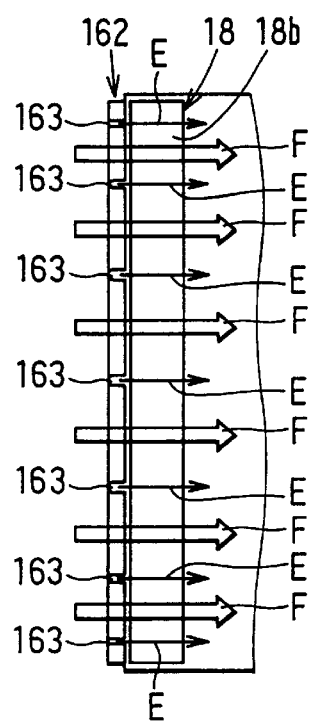

FIGS. 7A and 7B show a specific example of the distributing duct 162 and the outside air blowout openings 163 in the fourth preferred embodiment. The broken line A in FIG. 7A shows the partition line between the first duct 15 on the dehumidification side and the second duct 16 on the regeneration side. In this embodiment, the first duct 15 for dehumidification extends over an angular range of 230° in the rotation direction B of the drying agent unit 18, and the second duct 16 is formed over the remaining angular range of 130°.

The outside air blowout openings 163 of the distributing duct 162 are radially formed in multiple locations (in this example, nine locations) as shown by the hatched parts of FIG. 7A. The distributing duct 162 is so formed that it first carries the outside air from the periphery of the drying agent unit 18 to its center as shown by the arrow C in FIG. 7A, and then channels the outside air radially back from the center of the drying agent unit 18 toward its periphery as shown by the arrows D. In FIG. 7B, the arrows E show the flow of outside air blown from the outside air blowout openings 163, and the arrows F show the flow of inside air passing through the drying agent unit 18.

The dehumidification side drying agent $18a_1$, after being blown from the second duct 16 on the regeneration side into the first duct 15 on the dehumidification side, remains at a raised temperature after just being heated by the hot air for regeneration. However, in the example shown in FIGS. 7A and 7B, low-temperature outside air is first blown from an outside air blowout opening 163 as shown by the arrow C onto the dehumidification side drying agent $18a_1$ immediately after the agent is moved into the first duct 15. Furthermore, the opening area of the outside air blowout opening 163 in the position of the arrow C is several times the size of the outside air blowout openings 163 in the other positions. Consequently, the amount of air blown from the outside air blowout opening 163 in the position of the arrow C is large.

As a result, the dehumidification side drying agent $18a_1$, which is at a high temperature immediately after moving into the first duct 15 for dehumidification can be rapidly cooled.

(Fifth Preferred Embodiment)

Figure 8:
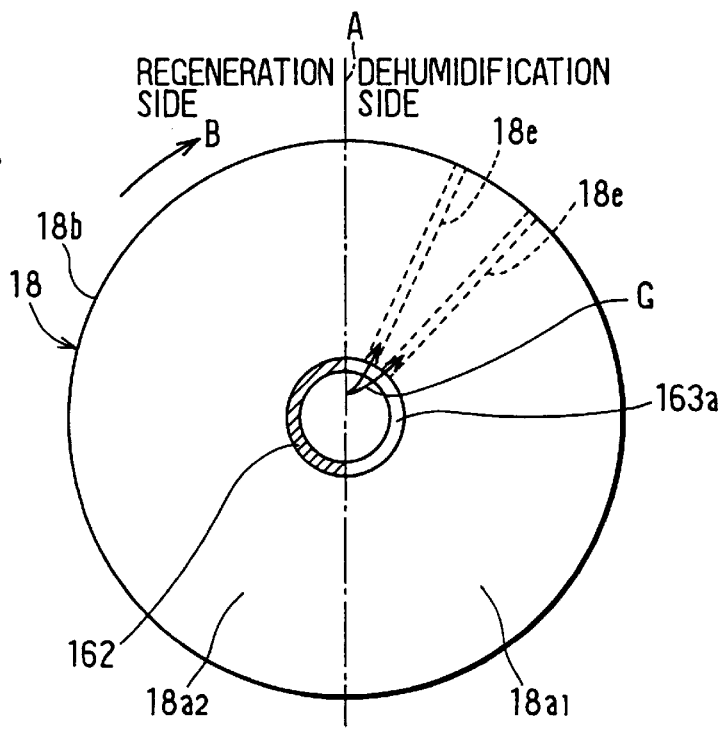
FIG. 8 is a partial sectional front view of a drying agent unit illustrating a fifth preferred embodiment of the present invention.
Figure 9:
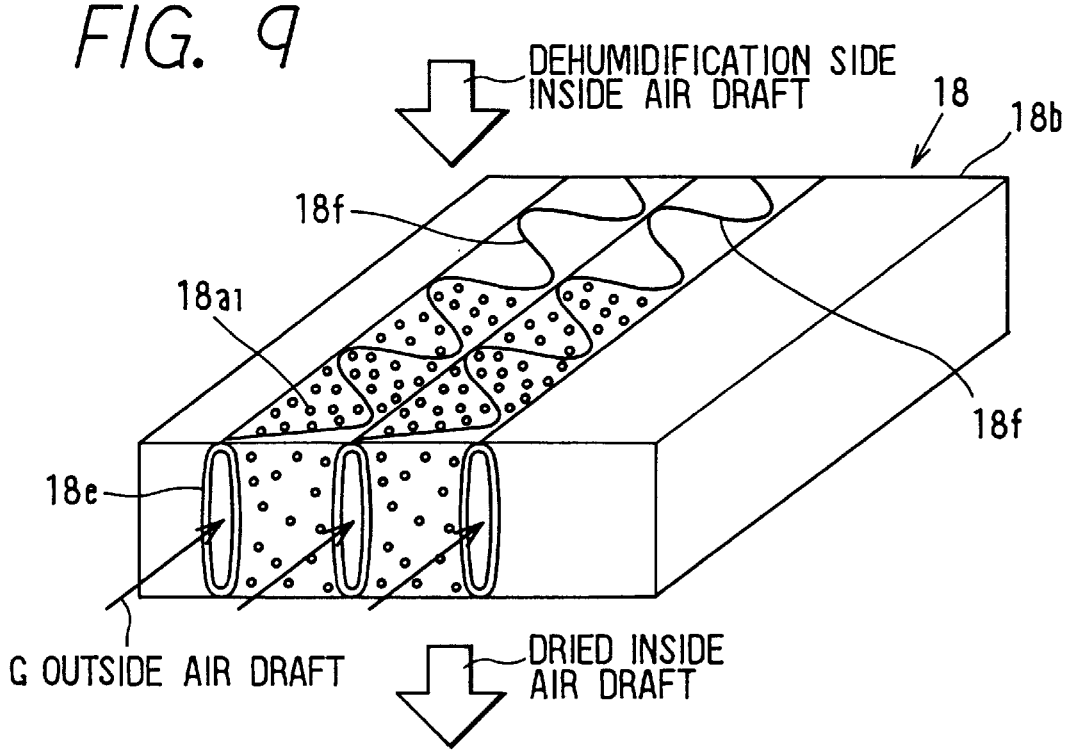
FIG. 9 is a partial perspective view of the drying agent unit in the fifth preferred embodiment.

FIG. 8 and FIG. 9 show a fifth preferred embodiment of the present invention. In the fourth preferred embodiment, outside air blower including the distributing duct 162 and the outside air blowout openings 163 was provided in the first duct 15 and the drying agent unit 18 was cooled by outside air being blown onto it. In the fifth preferred embodiment, a heat exchanger for exchanging heat between the dehumidification side drying agent $18a_1$ and outside air is integrated with the drying agent unit 18.

That is, as shown in FIG. 8, a tubular distributing duct 162 is disposed in a fixed state at the center of the disc-shaped drying agent unit 18. The drying agent unit 18 is rotatably disposed around the outside of this tubular distributing duct 162. A cutaway 163a for supplying outside air is formed in the distributing duct 162 over a semicircular range corresponding to the extent of the first duct 15.

In the drying agent unit 18, multiple radial tubes 18e are disposed with a uniform spacing around the circumference of the drying agent unit 18. When the multiple tubes 18e are positioned within the extent of the first duct 15 for dehumidification, the inner ends of the tubes 18e connect with the cutaway 163a of the distributing duct 162, and outside air flows into the tubes 18e as shown by the arrow G in FIG. 8.

A heat exchanging structure including the above-mentioned tubes 18e will now be described with reference to FIG. 9. The tubes 18e are cross-sectionally flat tubes formed using a metal having good thermal conductivity such as aluminum, and corrugated fins 18f formed using a metal such as aluminum are disposed between and joined (by brazing or the like) to the tubes 18e. The drying agent $18a_1$ and $18a_2$ is packed between the tubes 18e and the corrugated fins 18f.

Because the inner ends of those tubes 18e of the drying agent unit 18 positioned within the extent of the first duct 15 connect with the cutaway 163a of the distributing duct 162, outside air supplied into the distributing duct 162 flows into the tubes 18e as shown by the arrows G in FIG. 8 and FIG. 9. Consequently, heat is exchanged between the low-temperature outside air and the dehumidification side drying agent $18a_1$ through the corrugated fins 18f joined to the tubes 18e, and the dehumidification side drying agent $18a_1$ is thereby cooled.

(Sixth Preferred Embodiment)

Figure 10:
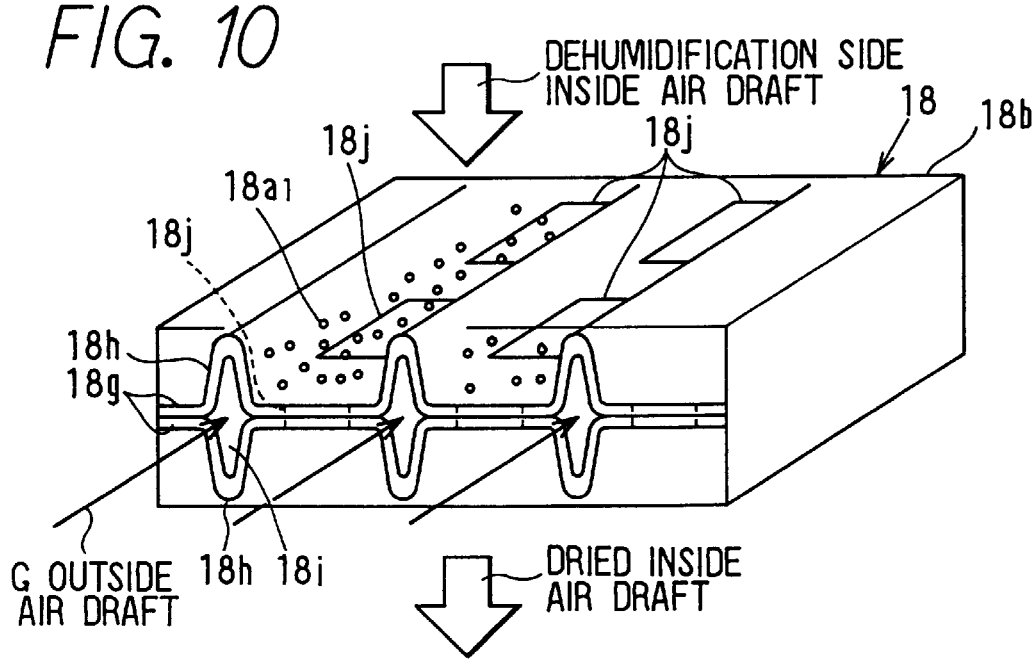
FIG. 10 is a partial perspective view of a drying agent unit in a sixth preferred embodiment of the present invention.

FIG. 10 shows a sixth preferred embodiment of the present invention. Whereas in the fifth preferred embodiment the heat exchanger was provided as a combination of the tubes 18e and the corrugated fins 18f, the heat exchanger has a different form in the sixth preferred embodiment. That is, concavities 18h and openings 18j are press-formed in plates 18g made of a metal having good thermal conductivity such as aluminum, and a pair of the metal plates 18g are brought face to face so that respective concavities 18h and openings 18j in each plate oppose one another.

The concavities 18h, 18h of the plates 18g, 18g form outside air passages 18i equivalent to the tubes 18e of the fifth preferred embodiment, and heat is exchanged between low-temperature outside air in the outside air passages $18_1$ and the dehumidification side drying agent $18a_1$. Thus, the dehumidification side drying agent $18a_1$ is cooled.

As the plate openings 18j, 18j face each other, inside air draft passages are formed in the metal plates 18g, thereby enabling inside air to pass through the drying agent unit 18 via the openings 18j, 18j.

(Other Preferred Embodiments)

The invention is not limited to the preferred embodiments described above, and various changes are possible. For example:

[1] Although in the first through third preferred embodiments described above the dehumidifier 10 is constructed independently of the ducting of the air-conditioning system, alternatively, as in the fourth through sixth preferred embodiments and as described in Japanese Patent Application Laid-open No. H.9-156349, the dehumidifier 10 may be integrally built in to the ducting of the air-conditioning system.

Conversely, whereas in the fourth preferred embodiment the dehumidifier 10 is built in to the ducting of the air-conditioning system, alternatively the dehumidifier 10 may be constructed independently of the ducting of the air-conditioning system in a position such as behind the passenger compartment.

[2] Although in all of the first through sixth preferred embodiments described above the drying agent unit 18 is of a rotating type for carrying out regeneration of the drying agent 18a, alternatively, as described in Japanese Patent Application Laid-open No. H.9-156349, the drying agent 18a may be divided into two packs, and dehumidification carried out by one drying agent 18a pack while regeneration of the other drying agent 18a pack is carried out, and the dehumidification and regeneration of the two packs of drying agent 18a alternated by switching of ventilation ducts.

[3] Although in the first through third preferred embodiments described above the role of the outside air blower of the outside air passage 20 is additionally performed by the blower 12 for blowing inside air, alternatively the outside air blower may be provided separately from the blower 12. In this case, outside air having absorbed heat from inside air is discharged through the outlet of the outside air passage 20 to outside the passenger compartment.

[4] By combining the cooling unit (17, 30, 33) for cooling the inside air flowing into the drying agent unit 18 described in the first through third preferred embodiments and the cooling unit (162, 163, 163a, 18e through 18j) for cooling the drying agent unit 18 described in the fourth through sixth preferred embodiments, the effects of the two cooling units may be obtained simultaneously and the dehumidification capacity of the drying agent unit 18 thereby further improved.

[5] The invention can also be applied to applications other than automotive vehicles.

While the above description is of the preferred embodiments of the present invention, it should be appreciated that the invention may be modified without departing from the proper scope or fair meaning of the accompanying claims. Various other advantages of the present invention will become apparent to those skilled in the art after having the benefit of studying the foregoing text and drawings taken in conjunction with the following claims.

What is claimed is:

1. A dehumidifier for dehumidifying inside air in a compartment, comprising:

a housing including an air inlet through which the inside air from the compartment flows;

an air drying unit including a drying agent for adsorbing water from the inside air flowing through the air inlet; and a drying agent cooling unit in communication with the air drying unit for removing water adsorbed by the drying agent to thereby cool the drying agent, wherein the drying agent cooling unit is in communication with an outside air atmosphere and cools the air drying unit with outside air.

2. The dehumidifier of claim 1, further comprising a blower for delivering the inside air through the air drying unit and into the compartment, wherein the blower also blows the outside air through the drying agent cooling unit.

3. The dehumidifier of claim 2, wherein the drying agent cooling unit includes an outside air blower for blowing outside air into communication with the air drying unit.

4. The dehumidifier of claim 1, wherein the drying agent cooling unit includes a heat exchanger, in fluid communication with the air drying unit, for exchanging heat with the drying agent.

5. The dehumidifier of claim 4, wherein the heat exchanger is integrally provided with the drying unit.

6. The dehumidifier of claim 1, further comprising a dehumidification side duct for taking in the inside air and passing it through the air drying unit, wherein outside air that has cooled the air drying unit is mixed in the dehumidification side duct with the inside air and supplied into the compartment.

7. The dehumidifier of claim 1, wherein the compartment is a vehicle passenger compartment, and further comprising:

a heat exchanger for heating air-conditioning air; and air-conditioning air ducts for blowing air heated by the heat exchanger into the vehicle passenger compartment;

wherein inside air from inside the vehicle passenger compartment having been dehumidified by the air drying unit is blown into the vehicle compartment through the air ducts.

8. A vehicle air-conditioning system, comprising:

a drying unit including a water-adsorbing drying agent for dehumidifying inside air from a vehicle passenger compartment;

a dehumidification side duct for taking in the inside air and passing it through the drying unit;

a drying agent cooler in fluid communication with the drying unit and with an outside atmosphere for cooling the drying agent with outside air;

a heat exchanger disposed upstream from the drying unit for heating the inside air;

air-conditioning air ducts for directing air heated by the heat exchanger back into the vehicle compartment; and a blower having an intake side connected to an outlet end of the dehumidification side duct being so that the blower blows the inside air through the air ducts into the vehicle compartment after the inside air is dehumidified.

9. The system of claim 8, further comprising:

a foot outlet, provided at an exit of the air-conditioning ducts, that directs air to a passenger foot location; and a defroster outlet, provided at an exit of the air-conditioning air ducts, for directing air at a vehicle windshield, wherein in a blowing mode in which both the foot outlet and the defroster outlet are open simultaneously an inside/outside air 2-layer flow mode wherein inside air from the vehicle compartment flows to the foot outlet and outside air flows to the defroster outlet is provided, and dehumidified inside air from the dehumidification side duct is mixed with outside air and blown through the defroster outlet.

10. The system of claim 8, wherein the heat exchanger and the drying unit comprise a single integrated component.

* * * * *